United States Patent Office 3,421,696
Patented Jan. 14, 1969

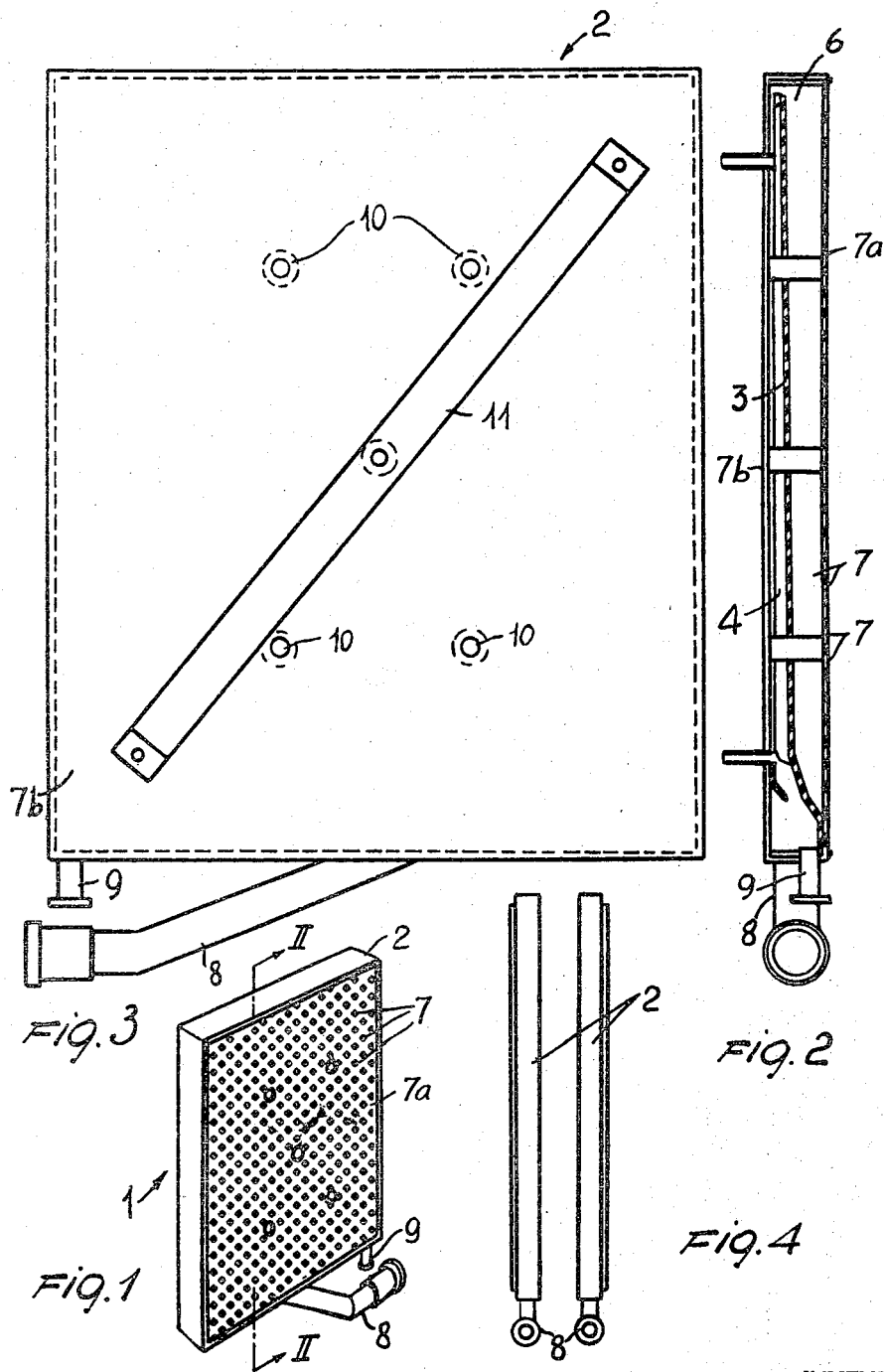

3,421,696
STEAM DIFFUSOR
Mario Carloni, Via di Montenero 98, Leghorn, Italy
Filed May 19, 1967, Ser. No. 639,822
Claims priority, application Italy, May 21, 1966,
18,149/66
U.S. Cl. 239—133            4 Claims
Int. Cl. B05b 1/24; B05b 1/26; B05b 1/14

ABSTRACT OF THE DISCLOSURE

A steam diffusor for processing edible products with superheated steam comprising a flat box-like casing with a diaphragm member within the casing. Dividing the interior of the casing in two mutually communicating spaces, one of such spaces communicating with the superheated steam supply and the other of such spaces communicating with apertures allowing passage of steam towards the products to be treated.

---

The present invention relates to a steam diffusor for industrially processing edible products such as alimentary pasta, biscuits, fruit, corn, rice and the like, with superheated steam.

In the foodstuff industry, such as alimentary pasta industry, it has been heretofore known to process edible products with superheated steam before the drying step of for instance pasta. This superheated steam processing is intended to remove moisture from the product (alimentary pasta) to assist and accelerate the subsequent final drying and to eliminate all inconveniences due to the presence of said moisture in the product, such as sticking, pulverizing and squashing of the pasta when produced. Furthermore by this processing all parasites are destroyed and colours of the processed products owing to the pigments present therein, are remarkably improved, thus eliminating the need of adding colouring agents to the product.

At present for steaming edible products, recourse is had to diffusor devices which, although widely used and although being advantageous from a few points of view, have a number of undesired drawbacks which are non negligible or even are closing with the benefits aimed at by the steaming operation. In fact, as it may be ascertained, the conventional diffusors have such a configuration as to cause the steam to undergo sudden temperature drops during the superheated steam processing step. The steam is thus often supplied to the product being processed with a moisture content within such a range that not only sometimes the moisture in the edible product is not completely eliminated, but an additional foreign moisture content is even sometimes added, which affects both the quality and the possibility of preserving the edible product.

The main object of the present invention is to provide a steam diffusor for the above mentioned use, which eliminates the above drawbacks, i.e. has a configuration and structure such as to assure that superheated steam reliably without inherent moisture in it nor carrying absorbed moisture along with it, is continuously supplied on the product being processed.

Another object of this invention is to provide a diffusor of general use in superheated steam processing for edible products, having a rational and functional structure, easy in its assembling with the related devices, and with very low load losses as compared with the conventional diffusors.

Another object of this invention is to provide a diffusor which is easy to maintain and control without using expensive equipments.

Still another object of this invention is to provide a diffusor which can be made up of materials having good mechanical characteristics and still being easily available on the market.

These and other objects which will better appear below, are attained by a steam diffusor according to the invention for processing edible products with superheated steam, which is characterized in that it comprises a box-shaped member having a substantially plate-like configuration, a diaphragm element internally and lengthwise on said member at least two contiguous rooms defined by said diaphragm element and said member and at least a communicating passage between the said two spaces, a plurality of apertures in one side of said member for communicating one of said rooms with the outside, superheated steam supplying means and exhaust means for the condensate, in communication with said other room.

Further characteristics and advantages of the invention will better appear from the following detailed description of a preferred embodiment of a diffusor according to the invention, which is illustrated by way of indicative and not limitative example in the accompanying drawing, in which:

FIG. 1 shows a perspective view of a diffusor according to the invention;

FIG. 2 shows a cross-section of the same diffusor, taken along line II—II in FIG. 1, in an enlarged scale;

FIG. 3 shows a rear view of the same diffusor as in FIG. 1, in an enlarged scale;

FIG. 4 diagrammatically shows one embodiment of a pair of diffusors for processing edible products with superheated steam.

With reference to the above-indicated figures, the diffusor 1 according to the invention consists of a box-shaped member 2 having a substantially parallel-piped-like configuration with one small dimension and two large opposite faces. Within the said member 2, a diaphragm 3 is provided along the length thereof, which defines therein two contiguous spaces or rooms communicating with one another at the edge 6 opposite the edge to which the said diaphragm is secured. According to a preferred embodiment, the diaphragm 3 is at an angle with respect to the two large opposite faces of the said member 2, whereby the contiguous spaces 4 and 5 have cross-section areas which increase and decrease respectively, from one end to the other of member 2. The space 5 communicates with the outside through a plurality of apertures or holes 7, uniformly formed in the faces 7a of the box-shaped member, while the space 4 communicates with a superheated steam supplying piping 8 and an exhaust duct 9 for discharging possible condensate. The above described unit which forms a diffusor according to the invention is stiffened by a plurality of spacers 10 adapted to withstand the pressure and temperature of the steam used in the desired processing.

Advantageously the diffusor according to the invention is provided with heating means 11, such as an electric resistor, located on the outer surface of the box-shaped member 2 and more precisely on the face 7a defining together with the diaphragm 3 the space 4, where the superheated steam is supplied.

The operation of the diffusor according to the invention is as follows: the superheated steam supplied to the space 4 through the piping 8, due to the even and suitable reduction of the cross-section of the said space, is accelerated, which aids possible moisture and condensate in the steam to separate.

In this way the superheated steam supplied to the contiguous space 5 and then to the product (alimentary pasta for instance), is completely free from moisture, thus meeting the requirements for the intended processing. To this end and in order to better assure that no moisture is present in the superheated steam coming from the diffusor, heating means 11 are provided which are intended to evaporate possible water droplets absorbed from the surrounding space and drawn along with it by the steam. In practice it has been found that just before the exit of space 4 the supplied superheated steam is completely dry, and the load losses are extremely limited. This is a remarkable advantage in comparison with the diffusor of conventional type.

Although a preferred embodiment has been described in its details, many changes and modifications could be made by a person skilled in the art, which are intended to come within the scope of the present invention as defined in the following claims.

I claim:
1. A steam diffusor, for processing edible products with superheated steam, which is characterized in that it comprises a box-shaped member having a substantially plate-like configuration, a diaphragm element internally and lengthwise on said member, at least two contiguous spaces defined by said diaphragm element and said member and at least a communicating passage between the said two spaces, a plurality of apertures in one side of said member for communicating one of said spaces with the outside, superheated steam supplying means and exhaust means for the condensate, in communication with said other space.

2. A diffusor as claimed in claim 1, wherein the said diaphragm element is located inside said box-shaped member at an angle with the faces of said body member, the said spaces having increasing and decreasing cross-section areas, respectively, starting from the side where superheated steam is supplied.

3. A diffusor as claimed in claim 1, comprising heating means in said box-shaped member.

4. A diffusor as claimed in claim 3, wherein the said heating means are located on the outer surface of the said member at the place to which superheated steam is supplied.

References Cited

UNITED STATES PATENTS 2,832,086   4/1958   Wells.
3,061,959   11/1962  Blumenfeld.

EVERETT W. KIRBY, *Primary Examiner.*

U.S. Cl. X.R.

239—504, 548